(12) United States Patent
Howard

(10) Patent No.: US 7,146,254 B1
(45) Date of Patent: *Dec. 5, 2006

(54) SYSTEMS AND METHODS FOR OPTIMIZING THE EFFICIENCY OF A WATERING SYSTEM THROUGH USE OF A COMPUTER NETWORK

(75) Inventor: Michael L. Howard, Sandy, UT (US)

(73) Assignee: Matsushita Electric Works, Ltd., Osaka (JP)

(*) Notice: Subject to any disclaimer, the term of this patent is extended or adjusted under 35 U.S.C. 154(b) by 754 days.

This patent is subject to a terminal disclaimer.

(21) Appl. No.: 10/190,179

(22) Filed: Jul. 5, 2002

(51) Int. Cl.
*G05D 7/00* (2006.01)
*A01G 25/16* (2006.01)

(52) U.S. Cl. .......................... 700/284; 239/69
(58) Field of Classification Search ................ 700/284; 239/69
See application file for complete search history.

(56) References Cited

U.S. PATENT DOCUMENTS

| | | | |
|---|---|---|---|
| 4,962,522 A | 10/1990 | Marian | 379/5 |
| 5,021,939 A | 6/1991 | Pulgiese | 364/143 |
| 5,208,855 A | 5/1993 | Marian | 380/9 |
| 5,229,937 A * | 7/1993 | Evelyn-Veere | 700/284 |
| 5,479,228 A | 12/1995 | Tamamura et al. | 354/106 |
| 5,870,302 A * | 2/1999 | Oliver | 700/11 |
| 6,314,340 B1 * | 11/2001 | Mecham et al. | 700/284 |
| 6,823,239 B1 * | 11/2004 | Sieminski | 700/284 |
| 2002/0014539 A1 * | 2/2002 | Pagano et al. | 239/1 |
| 2003/0126295 A1 * | 7/2003 | Doherty | 709/249 |
| 2004/0039489 A1 * | 2/2004 | Moore et al. | 700/284 |
| 2005/0038569 A1 * | 2/2005 | Howard | 700/284 |

OTHER PUBLICATIONS

U.S. Appl. No. 60/338,740.*
"Weather TRAK ET Irrigation Control System," http://www.aquacraft.com/weathert.htm, pp. 1-2, Feb. 19, 2002.
"Evapotranspiration: What is it and Why is it Important?", Marin Municipal Water District, http://www.marinwater.org/evaportranspiration.html, pp. 1-2, Feb. 20, 2002.
"Web Implemented Irrigation System", Chris Sontag, Circuit Cellar INK, Nov. 1998, Circuit Cellar Inc., USA, No. 100, pp. 26-31.

* cited by examiner

*Primary Examiner*—Leo Picard
*Assistant Examiner*—Steven R. Garland
(74) *Attorney, Agent, or Firm*—Madson & Austin

(57) ABSTRACT

An interface unit is disclosed for facilitating the optimization of a watering system. The interface unit includes a first interface configured to receive optimization data over a network. A second interface is also included, the second interface being configured for electronic communications with a watering system controller that controls operation of a watering system according to watering instructions stored in the watering system controller. The interface unit also includes a processor, the processor being in electronic communication with the first interface and the second interface. Memory is also included. The memory is in electronic communication with the processor, and is programmed with instructions for using the optimization data to modify the watering instructions.

9 Claims, 12 Drawing Sheets

SYSTEMS AND METHODS FOR OPTIMIZING THE EFFICIENCY OF A WATERING SYSTEM THROUGH USE OF A COMPUTER NETWORK

TECHNICAL FIELD

This invention relates generally to electronic devices, and is more particularly directed toward systems and methods for optimizing the efficiency of a watering system through the use of a computer network that is in electronic communication with an interface unit in electronic communication with a watering system controller.

BACKGROUND

Watering systems, including sprinkler systems, drip irrigation systems, etc., are typically used to supply water to plants, including crops, grass, trees, etc. A watering system typically includes a watering system controller which controls the operation of the watering system. Typically, the controller stores watering instructions which may include one or more watering schedules. The watering schedules may include information such as the time that the watering system is supposed to turn on and the time that the watering system is supposed to turn off. The watering system controller typically also has the capability to physically turn the watering system on and off at the appropriate times via communications with a plurality of electrically controlled water valves.

Both the climate of a particular area (i.e., the weather conditions that characteristically prevail in an area) as well as the immediate weather conditions in an area may affect the amount of water needed by plants in that area. For example, plants in an arid climate typically must be supplied with more water than plants in a moist, temperate climate. However, even plants that are located within an area having a moist, temperate climate may need additional water supplied to them during periods of uncharacteristic drought.

Most people, however, do not take into account weather conditions when deciding how much water to supply to their crops, lawn, etc. Instead, typical users program a particular watering schedule into a watering system controller at the beginning of the growing season. This watering schedule typically remains unchanged during the course of the growing season. However, the amount of water needed by plants may increase or decrease, depending on prevailing weather conditions. Failing to adjust the watering schedule to adapt to changing weather conditions may result in too little water being supplied to plants or in significant amounts of water being wasted.

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Many appliances, devices, etc., include one or more small computers. These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

Embedded systems may be used to control or monitor the use of certain resources. For example, embedded systems may be used to control or monitor a watering system controller. Benefits may be realized through the use of embedded systems to control and/or monitor the watering schedule stored in a watering system controller.

SUMMARY OF THE INVENTION

An interface unit is disclosed for communicating with a watering system controller. The interface unit includes a first interface configured to receive optimization data over a network. A second interface is also included that is configured for electronic communications with a watering system controller that controls operation of a watering system according to watering instructions stored in the watering system controller. The interface unit also includes a processor that is in electronic communication with the first interface and the second interface. Memory is also included. The memory is in electronic communication with the processor and is programmed with instructions for using the optimization data to modify the watering instructions.

The memory may be programmed with instructions for transmitting the modified watering instructions over the network to a computation unit. In one embodiment, the watering instructions may take the form of a watering schedule which specifies the length of operation of the watering system. In such an embodiment, the optimization data may take the form of a scaling factor which specifies how the watering schedule should be adjusted. In addition, the optimization data may be calculated based on weather information obtained from a weather database. The weather information may include evapotranspiration data. The scaling factor may be calculated based on a comparison of an anticipated precipitation value for the watering system and evapotranspiration data for the geographic region in which the watering system is located. Alternatively, the scaling factor may be calculated based on a comparison of previous evapotranspiration data and current evapotranspiration data for the geographic region in which the watering system is located.

A variety of networks may be used to carry the optimization data to the interface unit. For example, the network may take the form of a pager network, a cellular network, a global communications network, the Internet, a computer network, and/or a telephone network.

Additionally, the watering system may take a variety of forms. For example, the watering system may take the form of a sprinkler system and/or a drip irrigation system.

A method for communicating with a watering system controller is also disclosed. The method includes receiving optimization data over a network at an interface unit that functions as an interface between the network and a watering system controller that controls operation of a watering system according to watering instructions stored in the watering system controller. The method also includes using the optimization data to modify the watering instructions.

The method may include transmitting the modified watering instructions over the network to a computation unit. In one embodiment, the watering instructions may take the form of a watering schedule which specifies the length of operation of the watering system. In such an embodiment, the optimization data may take the form of a scaling factor which specifies how the watering schedule should be adjusted. In addition, the optimization data may be calculated based on weather information obtained from a weather database. The weather information may include evapotranspiration data. The scaling factor may be calculated based on a comparison of an anticipated precipitation value for the watering system and evapotranspiration data for the geographic region in which the watering system is located. Alternatively, the scaling factor may be calculated based on a comparison of previous evapotranspiration data and current evapotranspiration data for the geographic region in which the watering system is located.

A computation unit for communicating with an interface unit that is in communication with a watering system controller is also disclosed. The computation unit includes a first interface for receiving weather information from a weather database. A processor in electronic communication with the first interface is also provided. The computation unit also includes a memory in electronic communication with the processor, the memory being programmed with instructions for calculating optimization data based on the weather information. A second interface is also provided. The second interface is configured to transmit the optimization data over a network to a first interface unit. The first interface unit functions as an interface between the network and a first watering system controller that controls operation of a first watering system. The first interface unit is configured to use the optimization data to modify watering instructions stored in the first watering system controller.

The second interface may be further configured to receive a copy of the modified watering instructions from the first interface unit over the network. The memory may be configured to store the copy of the modified watering instructions. In one embodiment, the watering instructions may take the form of a watering schedule which specifies the length of operation of the watering system. In such an embodiment, the optimization data may take the form of a scaling factor which specifies how the watering schedule should be adjusted. In addition, the optimization data may be calculated based on weather information obtained from a weather database. The weather information may include evapotranspiration data. The scaling factor may be calculated based on a comparison of an anticipated precipitation value for the watering system and evapotranspiration data for the geographic region in which the watering system is located. Alternatively, the scaling factor may be calculated based on a comparison of previous evapotranspiration data and current evapotranspiration data for the geographic region in which the watering system is located.

The second interface may be further configured to transmit the optimization data over the network to a second interface unit. The second interface unit may function as an interface between the network and a second watering system controller that controls operation of a second watering system. The second interface unit may be configured to use the optimization data to modify watering instructions stored in the second watering system controller. In one embodiment, the same set of optimization data is transmitted to the first interface unit and the second interface unit. Alternatively, a first set of optimization data may be transmitted to the first interface unit, and a second set of optimization data may be transmitted to the second interface unit.

A variety of networks may be used to carry the optimization data from the computation unit to the interface unit. For example, the network may take the form of a pager network, a cellular network, a global communications network, the Internet, a computer network, and/or a telephone network.

A method for communicating with an interface unit that is in communication with a watering system controller is also disclosed. The method includes obtaining weather information from a weather database and calculating optimization data based on the weather information. The method also includes transmitting the optimization data over a network to a first interface unit. The first interface unit functions as an interface between the network and a first watering system controller that controls operation of a first watering system. The first interface unit is configured to use the optimization data to modify watering instructions stored in the first watering system controller.

The method may also include receiving a copy of the modified watering instructions from the first interface unit over the network and storing the copy of the modified watering instructions. In one embodiment, the watering instructions may take the form of a watering schedule which specifies the length of operation of the watering system. In such an embodiment, the optimization data may take the form of a scaling factor which specifies how the watering schedule should be adjusted. In addition, the optimization data may be calculated based on weather information obtained from a weather database. The weather information may include evapotranspiration data. The scaling factor may be calculated based on a comparison of an anticipated precipitation value for the watering system and evapotranspiration data for the geographic region in which the watering system is located. Alternatively, the scaling factor may be calculated based on a comparison of previous evapotranspiration data and current evapotranspiration data for the geographic region in which the watering system is located.

The method may also include transmitting the optimization data over a network to a second interface unit. The second interface unit may function as an interface between the network and a second watering system controller that controls operation of a second watering system. The second interface unit may be configured to use the optimization data to modify watering instructions stored in the second watering system controller. In one embodiment, the same set of optimization data is transmitted to the first interface unit and the second interface unit. Alternatively, a first set of optimization data is transmitted to the first interface unit, and a second set of optimization data is transmitted to the second interface unit.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the embodiments of the invention.

Figure 1:
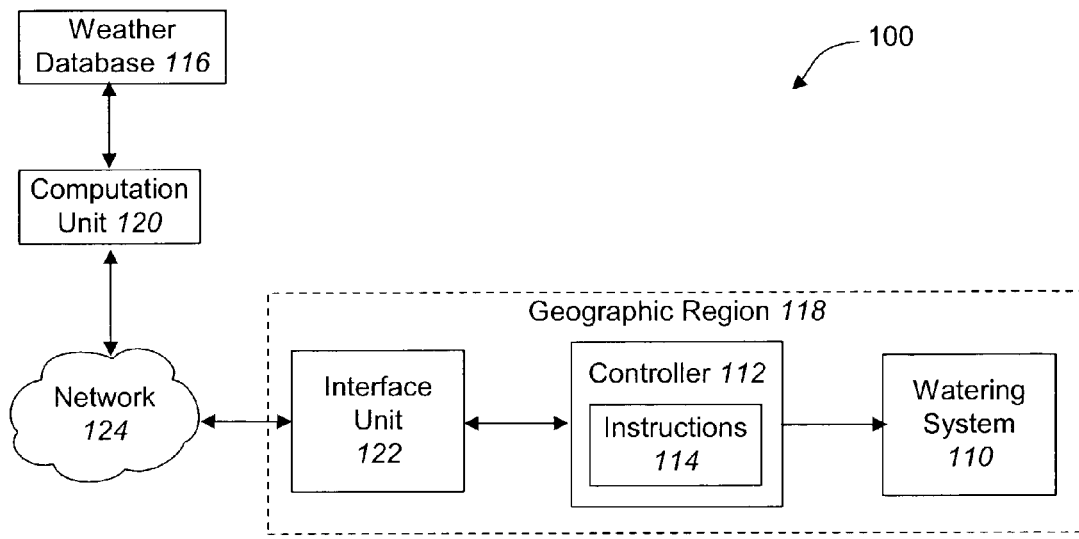
FIG. 1 is a block diagram of an embodiment of a system for optimizing the efficiency of a watering system.

FIG. 1 is a block diagram of an embodiment of a system 100 for optimizing the efficiency of a watering system 110. The watering system 110 may be any type of watering system, including a sprinkler system, a drip irrigation system, or the like.

The system 100 also includes a watering system controller 112 which controls the operation of the watering system 110. Typically, the controller 112 stores watering instructions 114 which may include one or more watering schedules. The watering schedules may include information such as the time that the watering system 10 is supposed to turn on and the time that the watering system 110 is supposed to turn off. The watering system controller 112 typically also has the capability to physically turn the watering system 110 on and off at the appropriate times via communications with a plurality of electrically controlled water valves. Watering system controllers 112 are commercially available.

The system 100 also includes a weather database 116 which includes one or more types of weather information for the geographic region 118 in which the watering system 110 is located. Weather information may include any information that may affect the amount of water that is supplied to plants in order for them to carry out their metabolic processes. Examples of such weather information include temperature, air pressure, humidity, precipitation, sunshine, cloudiness, winds, etc. In one embodiment, weather information may take the form of a reference evapotranspiration value. Evapotranspiration is the combination of water that is evaporated and transpired by plants as a part of their metabolic processes. It is typically measured in inches. If the daily reference evapotranspiration value for a particular region is, for example, 0.25 inches, this means that plants in that region need, on average, 0.25 inches of water per day in order to effectively carry out their metabolic processes.

Numerous weather stations are positioned in a variety of different locations around the world. These weather stations typically function to gather weather information and store it in weather databases 116. Many of these weather databases 116 are made available to the public. In the embodiment illustrated in FIG. 1, a computation unit 120 is configured to obtain weather information from the weather database 116. This may occur in any number of ways. For example, the computation unit 120 may take the form of a computer that is connected to the Internet. Software stored on the computation unit 120 may be configured to retrieve weather information from one or more weather databases 116 over the Internet. Alternatively, the computation unit 120 may include a storage device, such as a magnetic disk drive or an optical disk drive. A computer-readable medium containing one or more weather databases 116 may be used. The computation unit 120 may be configured to retrieve weather information from a database 116 stored on the medium. Those skilled in the art will recognize a variety of other ways in which the computation unit 120 may retrieve weather information from a weather database 116.

Based on the weather information obtained from the weather database 116, the computation unit 120 is configured to calculate optimization data, i.e., data which may be used to optimize the efficiency of the watering system 10. In one embodiment, the watering instructions 114 take the form of a watering schedule which specifies the length of operation of the watering system, and the computation unit 120 stores a copy of the watering schedule. In such an embodiment, the optimization data may take the form of a scaling factor which specifies how the watering schedule should be adjusted. Of course, a scaling factor is just one of many types of optimization data that will be readily recognized by those skilled in the art in light of the teachings contained herein.

The optimization data may be then transmitted to an interface unit 122 over a network 124. The network 124 may be a pager network, a cellular network, a global communications network, the Internet, a computer network, a telephone network, etc. Those skilled in the art will appreciate many additional networks 124 that may be used in light of the teachings contained herein.

The interface unit 122 functions as the interface between the network 124 and the watering system controller 112. The interface unit 122 is configured to receive optimization data over the network 124. The interface unit 122 is also configured for electronic communications with the controller 112. The interface unit 122 may use the optimization data received from the computation unit 120 to optimize the efficiency of the watering system 110 by modifying the watering instructions 114 stored in the controller 112. For example, suppose the watering system 110 is set to operate for 2 hours. In embodiments where the optimization data includes a scaling factor, suppose that a scaling factor of 0.5 is transmitted to the interface unit 122. The interface unit 122 may then modify the watering instructions 114 stored in the watering system controller 112 so that the length of operation of the watering system 110 is reduced in half, i.e., so that the watering system 110 only operates for 1 hour. Of course, those skilled in the art will recognize numerous other ways in which the interface unit 122 may modify the watering instructions 114 to optimize the efficiency of the watering system 110 in light of the teachings contained herein.

Figure 2:
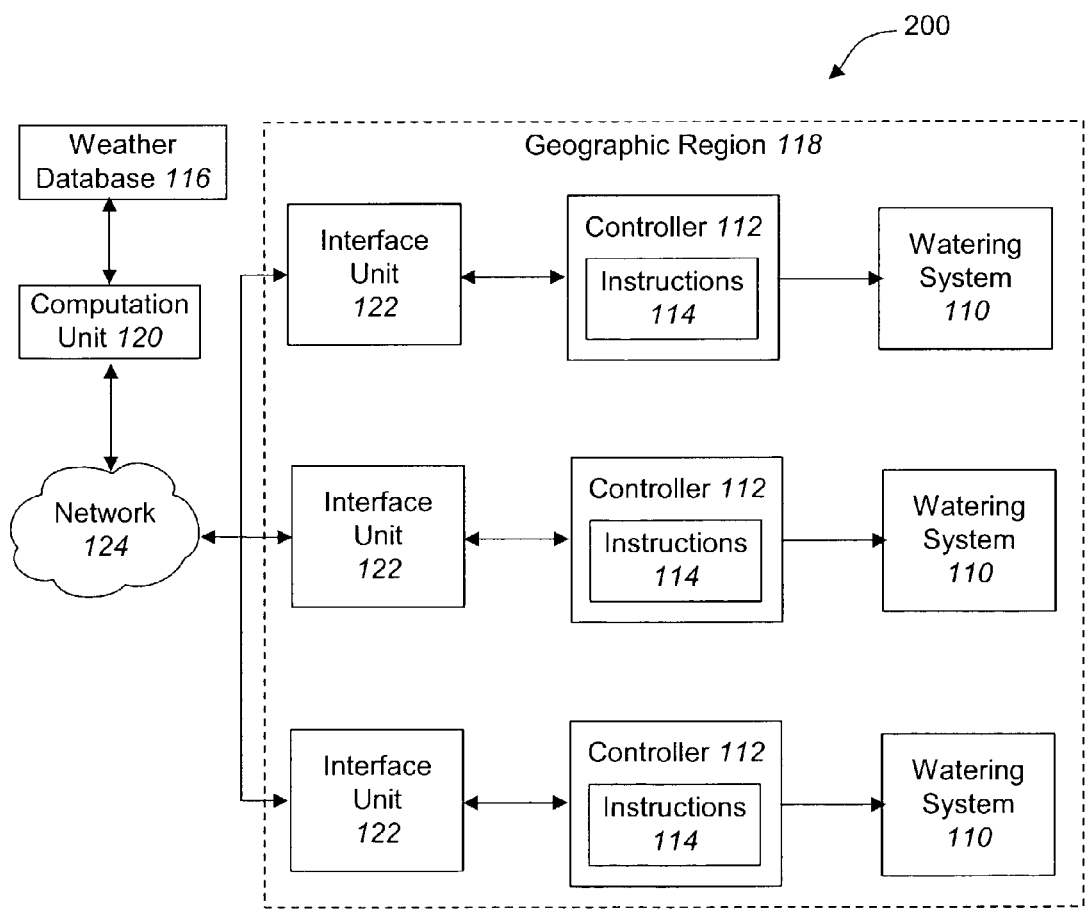
FIG. 2 is a block diagram of an alternative embodiment of a system for optimizing the efficiency of a watering system.

FIG. 2 is a block diagram of an alternative embodiment of a system 200 for optimizing the efficiency of a watering system 110. In the embodiment illustrated in FIG. 1, the optimization data calculated by the computation unit 120 is transmitted to a single interface unit 122. In FIG. 2, however, the optimization data calculated by the computation unit 120 is transmitted to a plurality of interface units 122. The plurality of interface units 122 illustrated in FIG. 2 are located in the same geographic region 118, i.e., the weather conditions are substantially similar in the areas in which the interface units 122 are located. Thus, each interface unit 122 may receive the same optimization data from the computation unit 120.

Figure 3:
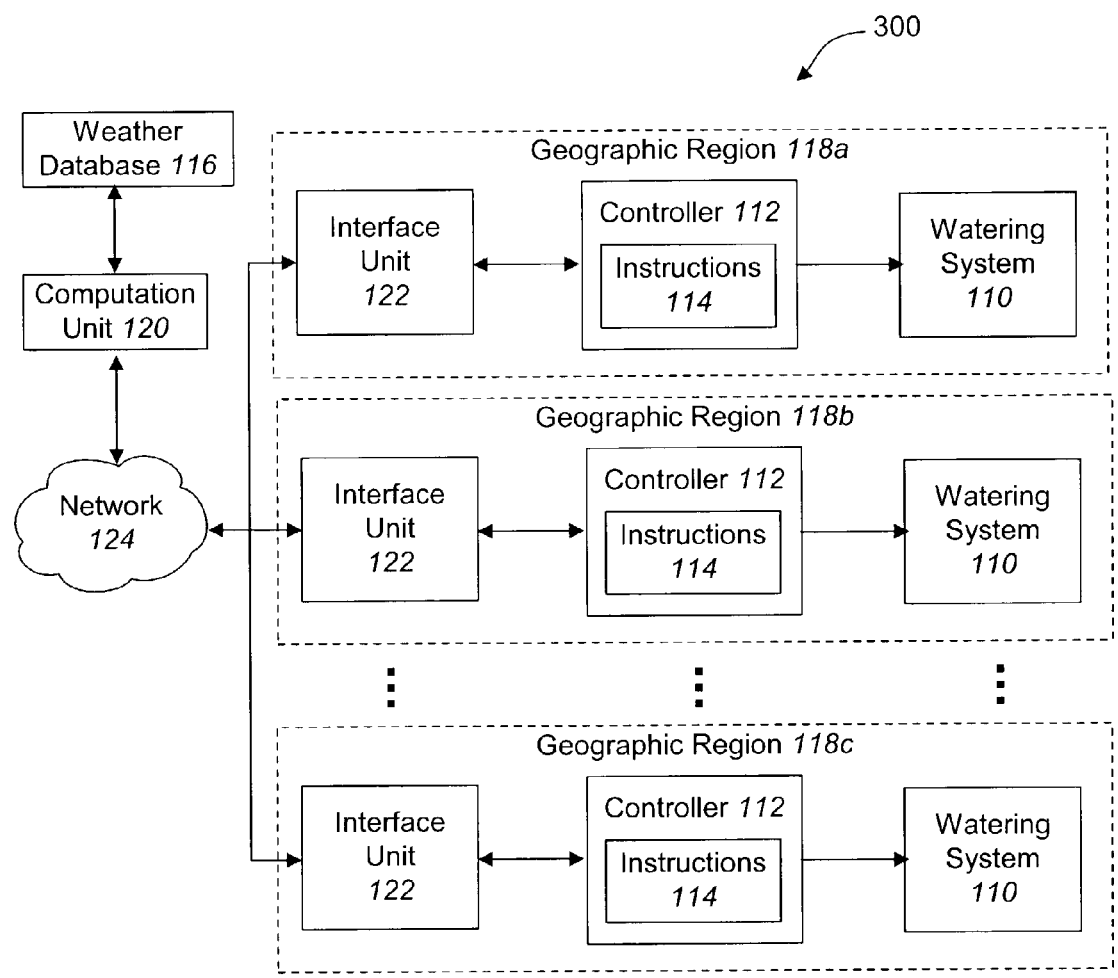
FIG. 3 is a block diagram of another alternative embodiment of a system for optimizing the efficiency of a watering system.

FIG. 3 is a block diagram of another alternative embodiment of a system 300 for optimizing the efficiency of a watering system 110. In the embodiment illustrated in FIG. 3, the plurality of interface units 122 are located in different geographic regions 118, i.e., the weather conditions are not necessarily similar in the areas in which the interface units 122 are located. Thus, each interface unit 122 may receive different optimization data from the computation unit 120.

Figure 4:
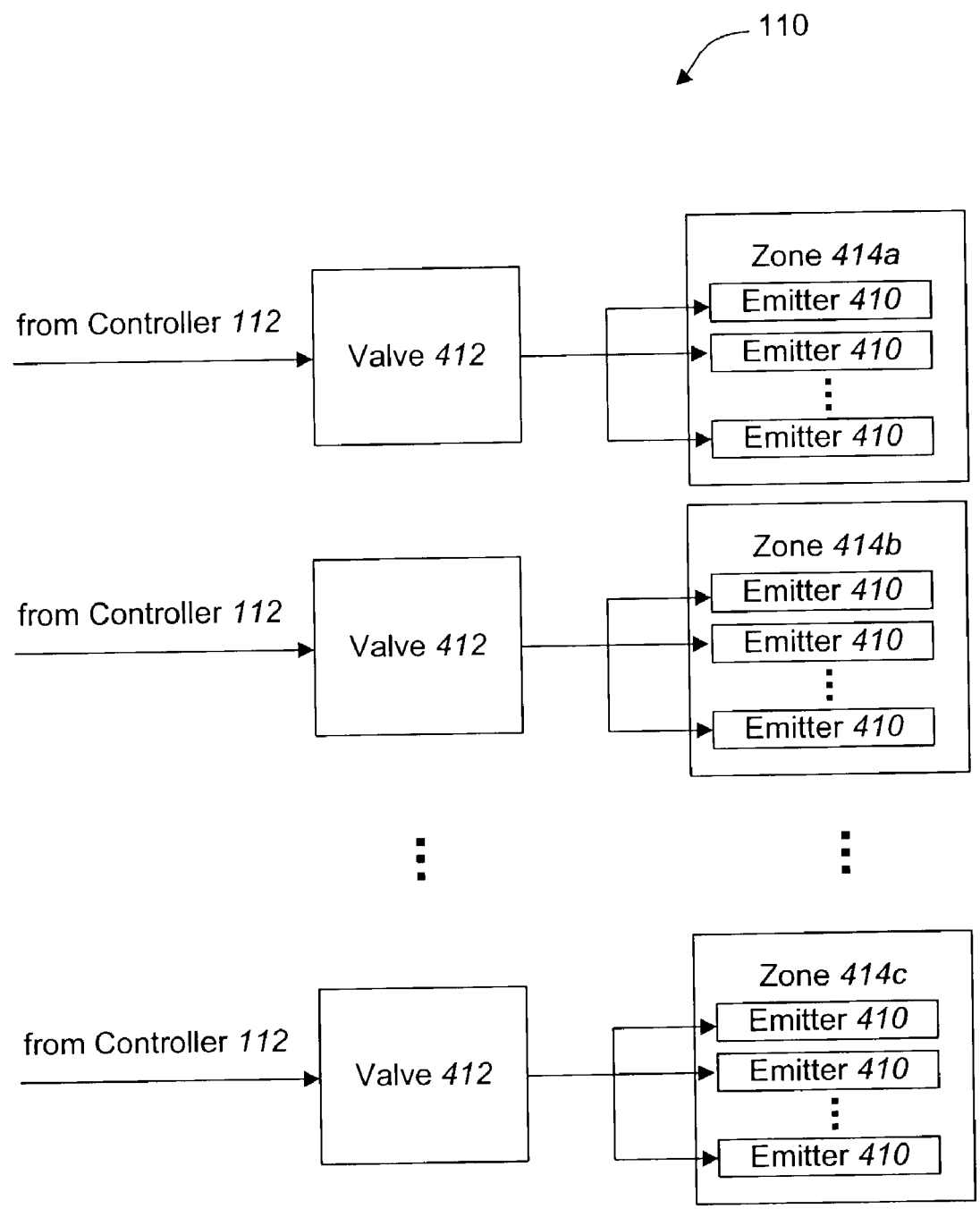
FIG. 4 is a block diagram of an embodiment of a watering system.

FIG. 4 is a block diagram of an embodiment of a watering system 110. As stated previously, the watering system 110 may be any type of watering system, including a sprinkler system, a drip irrigation system, or the like. Typically, the watering system 110 includes a plurality of emitters 410, each emitter 410 being spaced according to its range so as to cover a particular area of land. In a sprinkler system, the emitter 410 may take the form of a sprinkler. In a drip irrigation system, the emitter 410 may take the form of a leaky hose, leaky pipe, etc.

Water is typically supplied to the emitters 410 by water pipes connected to a water supply source through electrically operated valves 412. The valves 412 are configured to open to allow water to flow from the water source to the emitters 410, and to close to shut off the flow of water from the water source to the emitters 410. The emitters 410 are typically organized into zones 414 such that several individual emitters 410 in a particular area are controlled by a single valve 412, with several separately controlled zones 414 required to cover the entire area of land to be watered. Typically, only one zone 414 is watered at a time (i.e., only one valve 412 is open at a time) to ensure sufficient pressure to operate the emitters 410 in the zone 414.

The valves 412 are typically connected to the watering system controller 112. As stated previously, the controller 112 may include stored watering instructions 114 for controlling when the watering system 110 is in operation, i.e., when the valves 412 are opened and closed.

Figure 5:
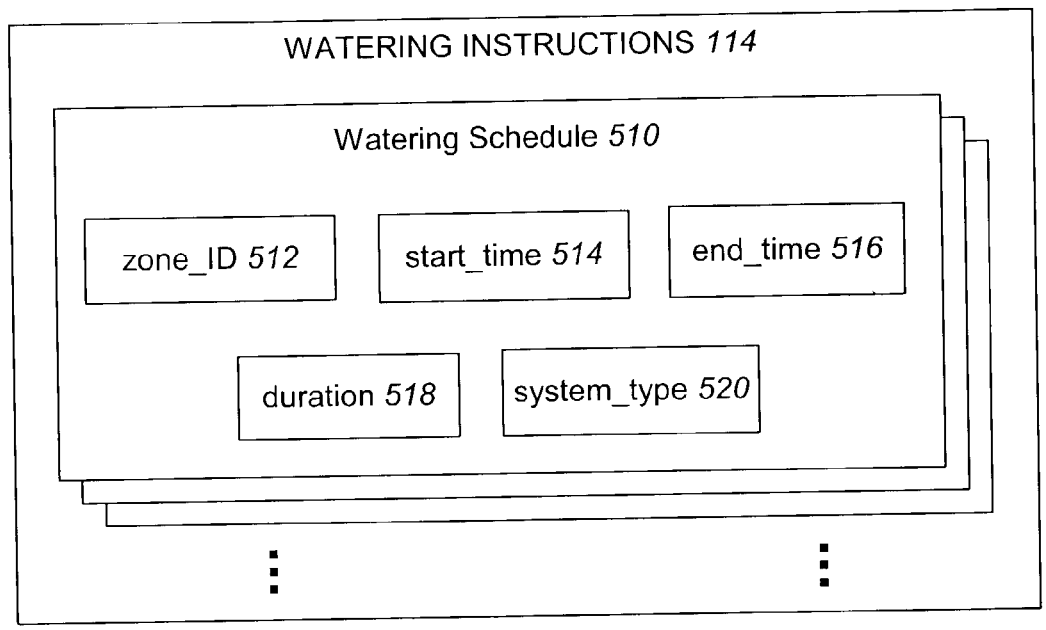
FIG. 5 is a block diagram illustrating one embodiment of the watering instructions that may be stored within the controller.

FIG. 5 is a block diagram illustrating one embodiment of the watering instructions 114 that may be stored within the controller 112. The watering instructions 114 may include one or more watering schedules 510. A different watering schedule 510 may be provided for each zone 414. Each watering schedule 510 may include a zone_ID field 512 which specifies the zone 414 to be watered, a start_time field 514 which specifies the time that watering should begin in the zone 414, an end_time field 516 which specifies the time that watering should end in the zone 414, and a duration field 518 which specifies the total time spent watering in the zone 414. The duration field 518 is equal to the end_time field 516 minus the start_time field 514. Each watering schedule 510 may also include a system_type field 520 which specifies the type of watering system 110. For example, the system_type field 520 may indicate whether the watering system 110 is a sprinkler system, a drip irrigation system, etc. The system_type field 520 may be useful because precipitation rates differ for different types of watering systems 110. As will be explained in greater detail below, the precipitation rate of a watering system 110 may be used to calculate optimization data, such as a scaling factor.

Figure 6:
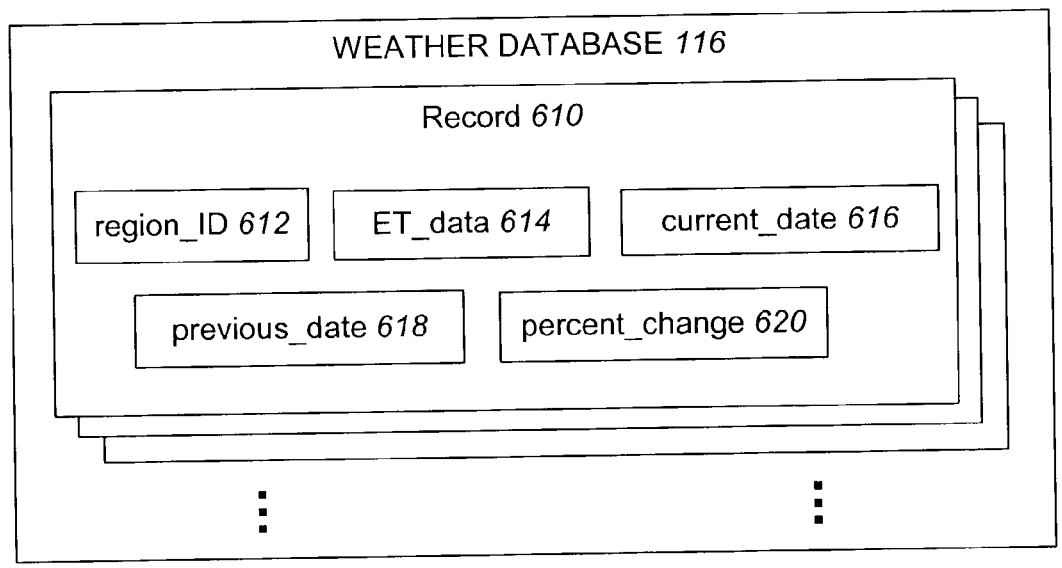
FIG. 6 is a block diagram illustrating one embodiment of a weather database.

FIG. 6 is a block diagram illustrating one embodiment of a weather database 116. The weather database 116 may include one or more records 610. Each record 610 contains weather information corresponding to a different geographic region 118. Each record 610 may include a region_ID field 612, which specifies the geographic region 118 to which the record 610 corresponds. Each record 610 may also include one or more types of weather information for the geographic region 118 in which the watering system 110 is located. In the embodiment shown in FIG. 6, the weather information takes the form of reference evapotranspiration values. The reference evapotranspiration value for the geographic region 118 identified by the region_ID field 612 may be stored in an ET_data field 614. A current_date field 616 may be provided to specify the most recent date on which the ET_data field 614 was updated. A previous_date field 618 may be provided to specify the most recent date prior to the current_date 616 on which the ET_data field 614 was updated. A percent_change field 620 may be provided to specify the percent change between the ET_data field 614 on the date corresponding to the previous_date field 618 and the ET_data field 614 on the date corresponding to the current_date field 616.

Figure 7:
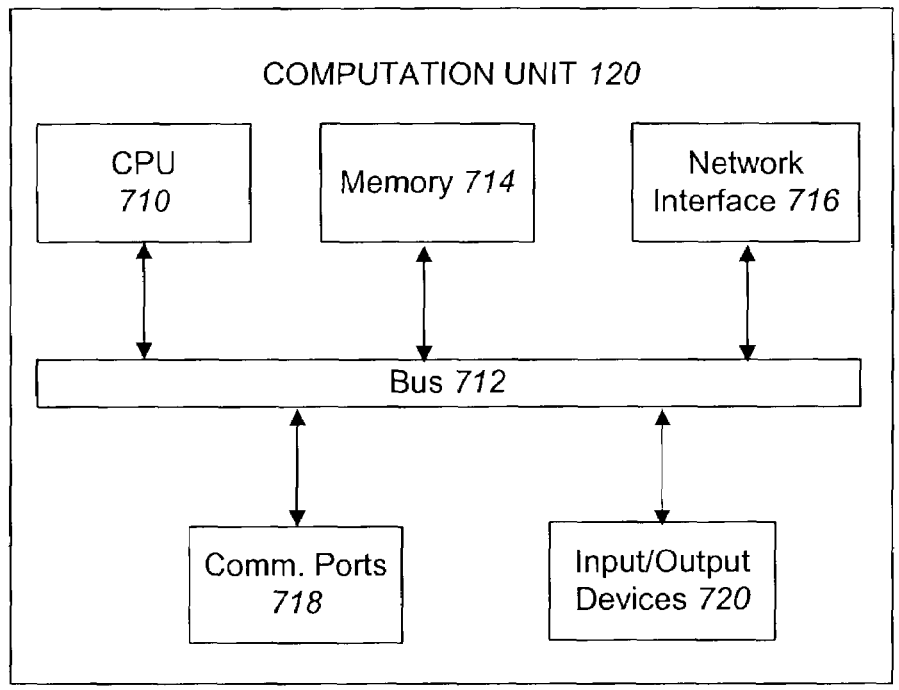
FIG. 7 is a block diagram of hardware components that may be used in an embodiment of the computation unit.

FIG. 7 is a block diagram of hardware components that may be used in an embodiment of the computation unit 120. The computation unit 120 may be embodied in a computer, as will be appreciated by those skilled in the art. Many different kinds of computers are commercially available.

A CPU 710 may be provided to control the operation of the computation unit 120, including the other components thereof, which are coupled to the CPU 710 via a bus 712. The CPU 710 may be embodied as a microprocessor, microcontroller, digital signal processor or other device known in the art. The CPU 710 performs logical and arithmetic operations based on program code stored within the memory 714. In certain embodiments, the memory 714 may be on-board memory included with the CPU 710. For example, microcontrollers often include a certain amount of on-board memory.

The computation unit 120 may also include a network interface 716. The network interface 716 facilitates communication between the computation unit 120 and other devices connected to the network 124, such as the interface unit 122. As stated previously, the network 124 may be a pager network, a cellular network, a global communications network, the Internet, a computer network, a telephone network, etc. The network interface 716 operates according to standard protocols for the applicable network 124.

The computation unit 120 may also include memory 714. The memory 714 may include a random access memory (RAM) for storing temporary data. Alternatively, or in addition, the memory 714 may include a read-only memory (ROM) for storing more permanent data, such as fixed code and configuration data. The memory 714 may also be embodied as a magnetic storage device, such as a hard disk drive. The memory 714 may be any type of electronic device capable of storing electronic information.

The computation unit 120 may also include communication ports 718, which facilitate communication with other devices. The computation unit 120 may also include input/output devices 720, such as a keyboard, a mouse, a joystick, a touchscreen, a monitor, speakers, a printer, etc.

Figure 8:
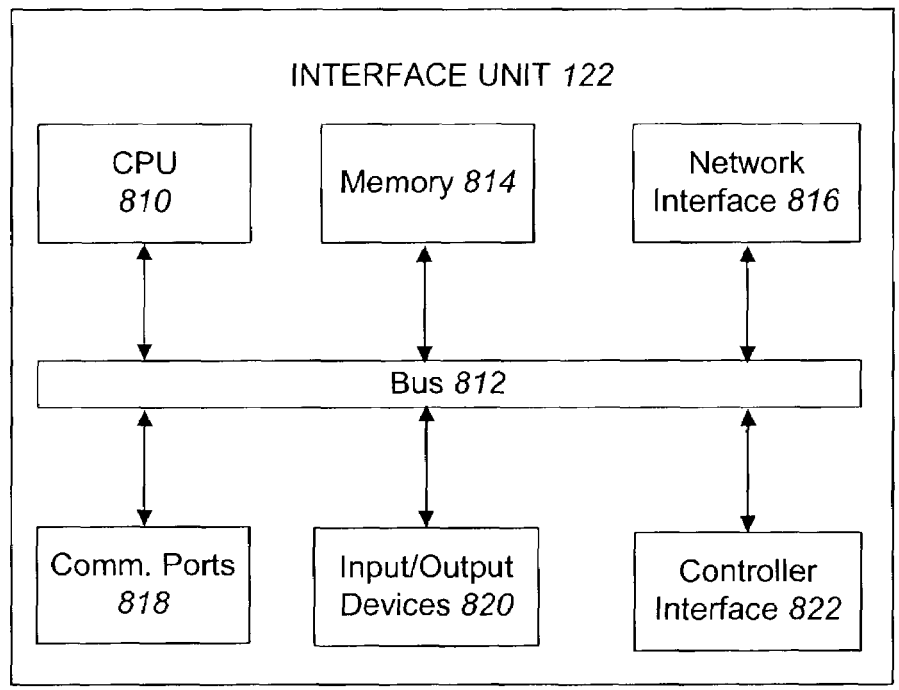
FIG. 8 is a block diagram of hardware components that may be used in an embodiment of an interface unit.

FIG. 8 is a block diagram of hardware components that may be used in an embodiment of an interface unit 122. The embodiment of the interface unit 122 illustrated in FIG. 8 includes a CPU 810, a network interface 816, memory 814, communication ports 818, and I/O devices 820. These components operate similarly to the corresponding components illustrated and discussed previously in connection with the computation unit 120.

In addition, the interface unit 122 also includes a controller interface 822. The controller interface 822 enables electronic communication between the interface unit 122 and the controller 112. The precise configuration of the controller interface 822 will vary depending on the type of watering system controller 112 used. Specifications for commercially available watering system controllers 112 are readily available, and those skilled in the art are capable of determining the necessary configuration of the controller interface 822.

Of course, the block diagrams of FIGS. 7 and 8 are only meant to illustrate typical hardware components of a computation unit 120 and an interface unit 122. These diagrams are not meant to limit the scope of embodiments disclosed herein.

Figure 9:
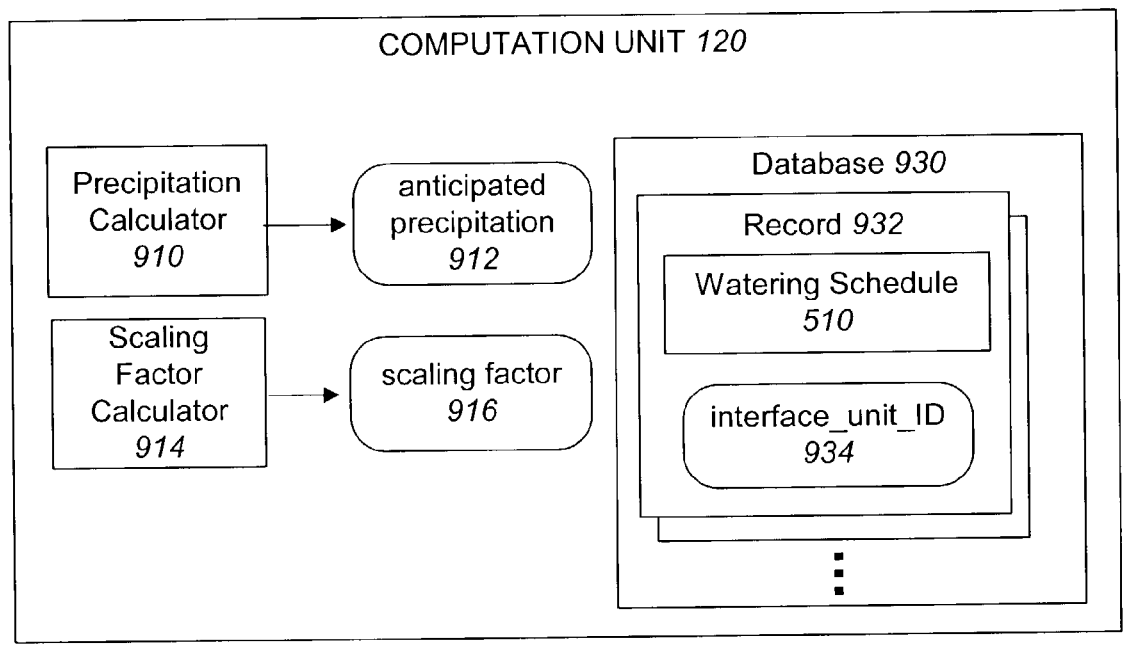
FIG. 9 is a block diagram illustrating software components of an embodiment of the computation unit.

FIG. 9 is a block diagram illustrating software components of an embodiment of the computation unit 120. The computation unit 120 is programmed with instructions for calculating optimization data based on weather information obtained from the weather database 116.

The computation unit may include a database 930 which includes a plurality of records 932. Each record 932 may include a copy of the watering schedule 510 associated with a particular watering system 110. Each record 932 may also include an interface_unit_ID field 934. The interface_unit_ID field 934 identifies the interface unit 122 which is in electronic communication with the watering system 110 to which the watering schedule 510 corresponds.

The computation unit 120 may also include a precipitation calculator 910. The precipitation calculator 910 calculates the amount of precipitation that a watering system 110 will provide over a given time. In one embodiment, the precipitation calculator 910 accepts as input the duration and system_type fields 518, 520 from a watering schedule 510. Based on the system_type field 520, the precipitation calculator 910 calculates and stores the anticipated precipitation 912 for that watering system 110, i.e., the amount of precipitation that each emitter 410 within the zone 414 will provide during the amount of time specified in the duration field 518.

For example, suppose that the system_type field 520 indicates that the watering system 110 is a sprinkler system. Typically, the precipitation rate for a sprinkler is 2 inches per hour; this value may be used by the precipitation calculator 910 as an approximation to determine the anticipated precipitation 912. Continuing with the example, suppose that the duration field 518 equals 0.5 hours. The anticipated precipitation 912 would then be 1 inch (0.5 hours*2 inches per hour). In an alternative embodiment, the watering schedule 510 may include an additional field that specifies the exact precipitation rate for the particular watering system 110 with which it is associated.

The computation unit 120 may also include a scaling factor calculator 914. As stated previously, the optimization data calculated by the computation unit 120 may take the form of a scaling factor 916 which specifies how the length of operation of the watering system 110 should be adjusted. In one embodiment, the scaling factor calculator 914 accepts as input the anticipated precipitation 912 associated with a particular zone 414 in a particular watering system 110, and the ET_data field 614 associated with the geographic region 118 in which the watering system 110 is located. As stated previously, the computation unit 120 may obtain the ET_data field 614 from the weather database 116.

By comparing the anticipated precipitation 912 for the watering system 110 with the ET_data field 614, the computation unit 120 may calculate and store the scaling factor 916 associated with that watering system 110. For example, if the anticipated precipitation 912 for a zone 414 within a watering system 110 is 0.5 and the ET_data field 614 associated with the geographic region 118 in which the watering system 110 is located is 0.25, the watering system 110 is scheduled to produce twice as much precipitation as is necessary for plants within the geographic region to efficiently carry out their metabolic processes. Thus, the scaling factor 916 is calculated to be 0.25/0.5=0.5.

Figure 10:
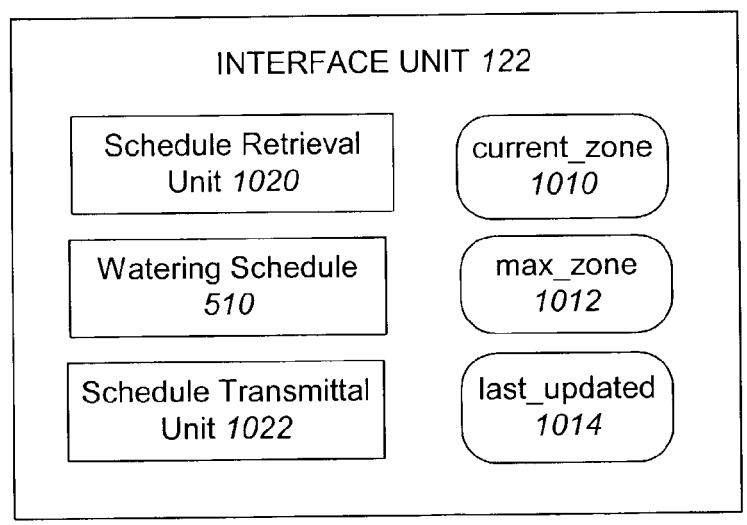
FIG. 10 is a block diagram illustrating software components of an embodiment of an interface unit.

FIG. 10 is a block diagram illustrating software components of an embodiment of an interface unit 122. As stated previously, the interface unit 122 is configured for electronic communications with a watering system controller 112 that controls operation of a watering system 110. The interface unit 122 is also programmed with instructions for using optimization data generated by the computation unit 120 to modify watering instructions 114 for the watering system 110.

The interface unit 122 may store three variables, a current_zone variable 1010, a max_zone variable 1012, and a last_updated variable 1014. The max_zone variable 1012 equals the number of zones 414 within the watering system 110 associated with the interface unit 122. The current_zone variable 1010 is used to modify watering instructions 114 for the watering system 110, as will be explained below. The current_zone variable 1010 may be any value between 1 and the value of the max_zone variable 1012. The last_updated variable 1014 equals the last date that the interface unit 122 received optimization data from the computation unit 120 and accordingly modified the watering schedule 510 in the associated controller 112.

The interface unit 122 may also include a schedule retrieval unit 1020 and a schedule transmittal unit 1022. Recall that each interface unit 122 is in electronic communication with a watering system controller 112. The schedule retrieval unit 1020 is configured to retrieve a copy of the watering instructions 114 stored in the watering system controller 112 with which the interface unit 122 is in electronic communication. In one embodiment, the watering instructions take the form of a watering schedule 510, which may be stored in the interface unit 122. The schedule transmittal unit 1022 is then configured to transmit the stored watering schedule 510 over the network 124 to the computation unit 120.

Although the items of FIGS. 9 and 10 are described as being software components, and the items of FIGS. 7 and 8 are described as being hardware components, it will be appreciated that hardware components may be substituted for various software components, and some hardware components may be achieved through software components.

Figure 11:
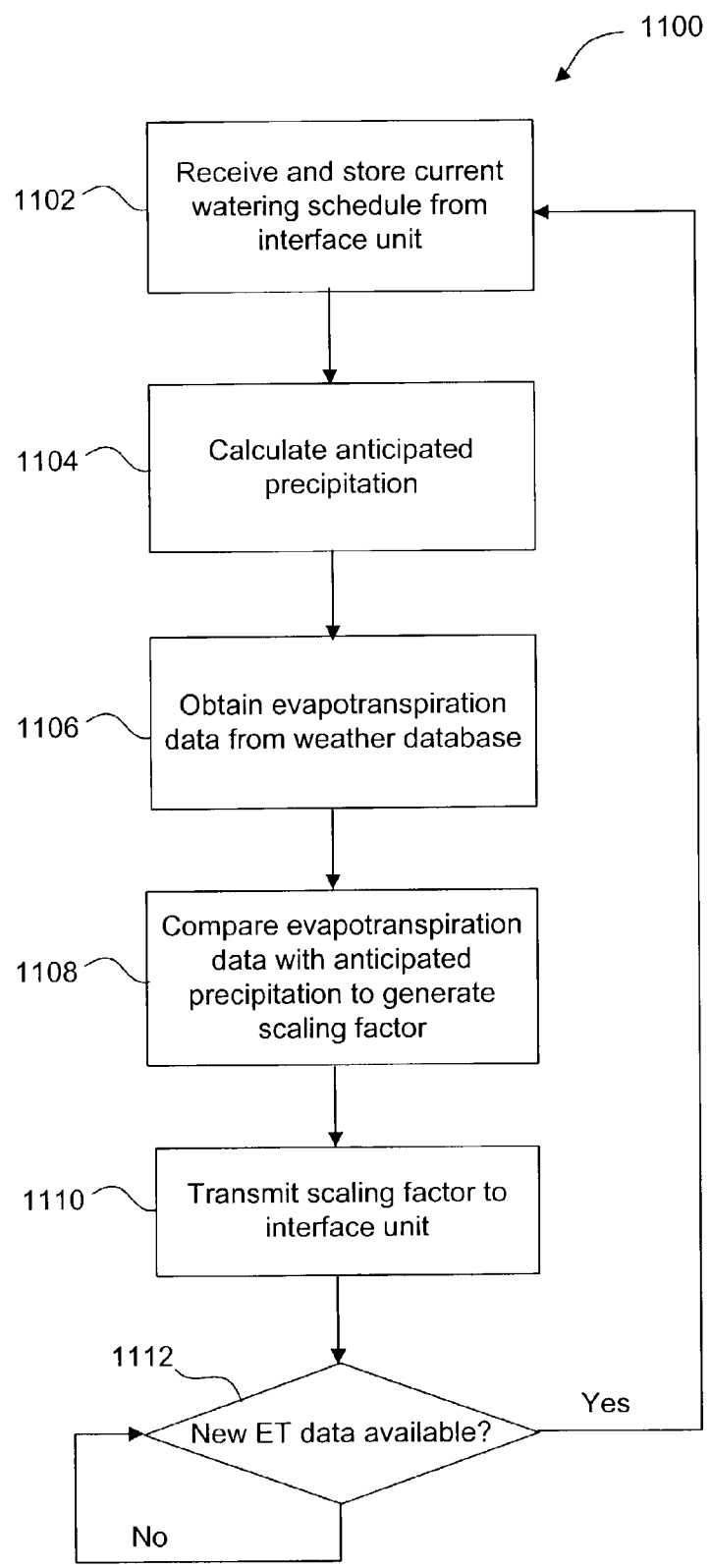
FIG. 11 is a flow diagram illustrating a method for determining optimization data.

FIG. 11 is a flow diagram illustrating a method 1100 for determining optimization data. The method 1100 may be implemented by the computation unit 120 using the hardware components illustrated in FIG. 7 and the software components illustrated in FIG. 9.

In accordance with the method 1100, the computation unit 120 may first receive 1102 the current watering schedule 510 for a particular watering system 110 from the corresponding interface unit 122. The watering schedule 510 may then be stored in the database 930. The computation unit 120 may then calculate 1104 the anticipated precipitation 912 for a particular watering system 110.

The computation unit 120 may then obtain 1106 weather information, such as the reference evapotranspiration value for the geographic region 118 in which the watering system 110 is located, from the weather database 116. As stated previously, the reference evapotranspiration value may be represented by the ET_data field 614 in the weather database 116. The computation unit 120 may then compare 1108 the reference evapotranspiration value (as represented in the ET_data field 614) with the anticipated precipitation 912 to generate a scaling factor 916. The scaling factor 916 may then be transmitted 1110 to the interface unit 122. The computation unit 120 then waits until it determines 112 that new weather information (e.g., new reference evapotranspiration data) is available from the weather database 116, at which point the method 1100 repeats itself beginning at step 1104.

Figure 12:
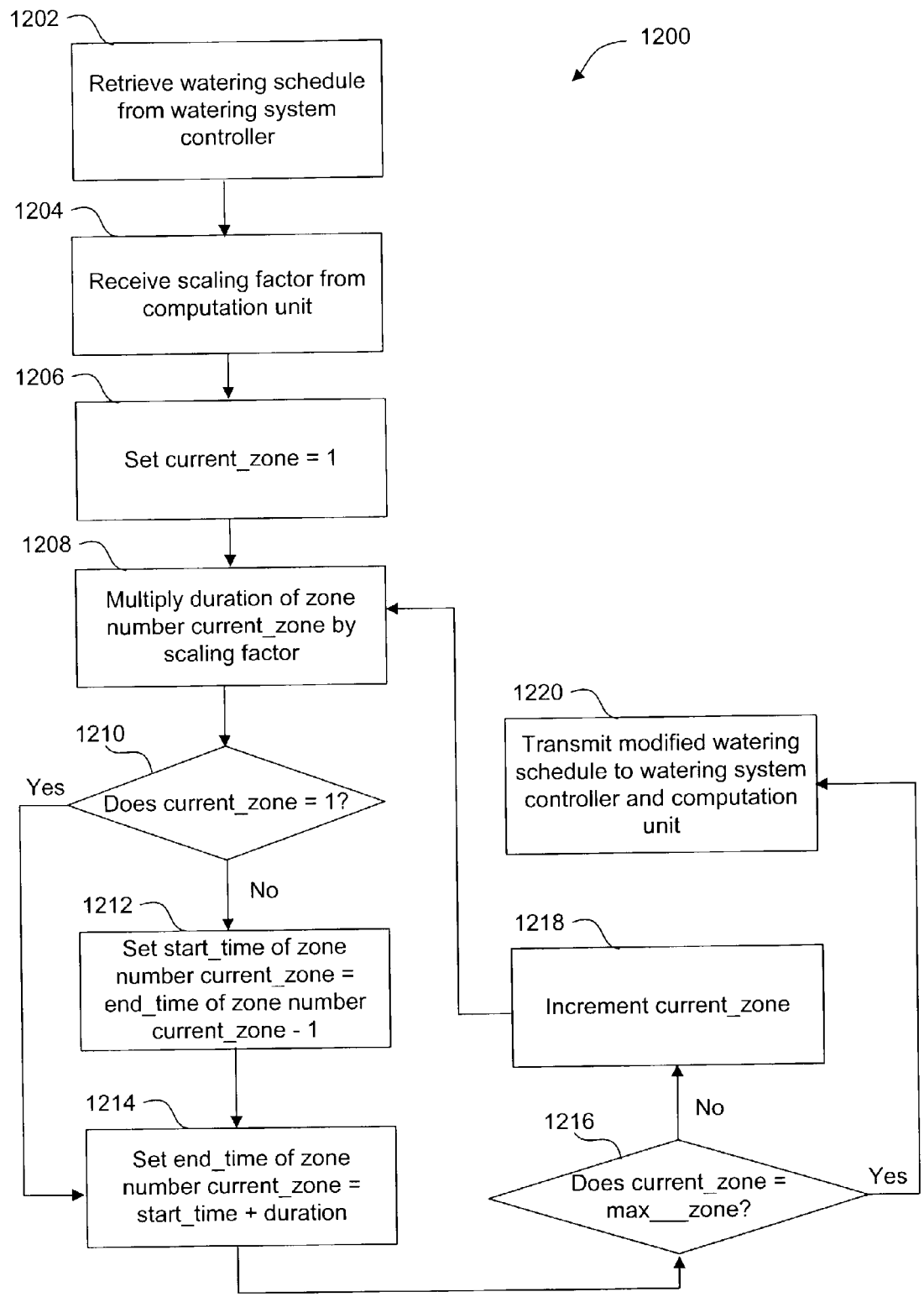
FIG. 12 is a flow diagram illustrating a method for using optimization data to modify a watering schedule stored in a watering system controller.

FIG. 12 is a flow diagram illustrating a method 1200 for using the optimization data generated by the computation unit 120 to modify a watering schedule 510 stored in a watering system controller 112. The method 1200 may be implemented by the interface unit 122 using the hardware components illustrated in FIG. 8 and the software components illustrated in FIG. 10.

The interface unit 122 may first retrieve 1202 a copy of the watering instructions 114 stored in the watering system controller 112 for the watering system 110 with which the interface unit 122 is associated. As stated previously, the watering instructions 114 may take the form of a watering schedule 510. The interface unit 122 may then receive 1204 optimization data that corresponds to the watering system 110 with which the interface unit 122 is associated. In one embodiment, the optimization data may be the scaling factor 916. The current_zone field 1010 in the interface unit 122 is then set 1206 equal to 1. In the watering schedule 510 stored in the interface unit 122, the duration field 518 of the zone 414 corresponding to the current_zone variable 1010 is then multiplied 1208 by the scaling factor 916. For example, because the current_zone field 1010 in the interface unit 122 is initially set 1206 equal to 1, the duration field 518 of zone number 1 is initially multiplied by the scaling factor 916.

The interface unit 122 then determines 1210 whether the current_zone variable 1010 is equal to 1. If the current_zone variable 1010 does not equal 1, the start_time field 514 of the zone 414 corresponding to the current_zone variable 1010 is set equal to the end_time field 516 of the zone 414 corresponding to the current_zone variable 1010 minus 1. Then the end_time field 516 of the zone 414 corresponding to the current_zone variable 1010 is set 1214 equal to the start_time field 514 plus the duration field 518. If in step 1210 it is determined 1210 that the current_zone variable 1010 is equal to 1, the method 1200 skips to step 1214.

The interface unit 122 then determines 1216 whether the current_zone variable 1010 equals the max_zone variable 1012. If the current_zone variable 1010 does not equal the max_zone variable 1012, the current_zone variable 1010 is incremented 1218. The method 1200 then returns to step 1208 and proceeds as described above. If in step 1216 it is determined that the current_zone variable 1010 equals the max_zone variable 1012, the modified watering schedule 510 is then transmitted 1220 to the water system controller 112 and the computation unit 120.

Figure 13:
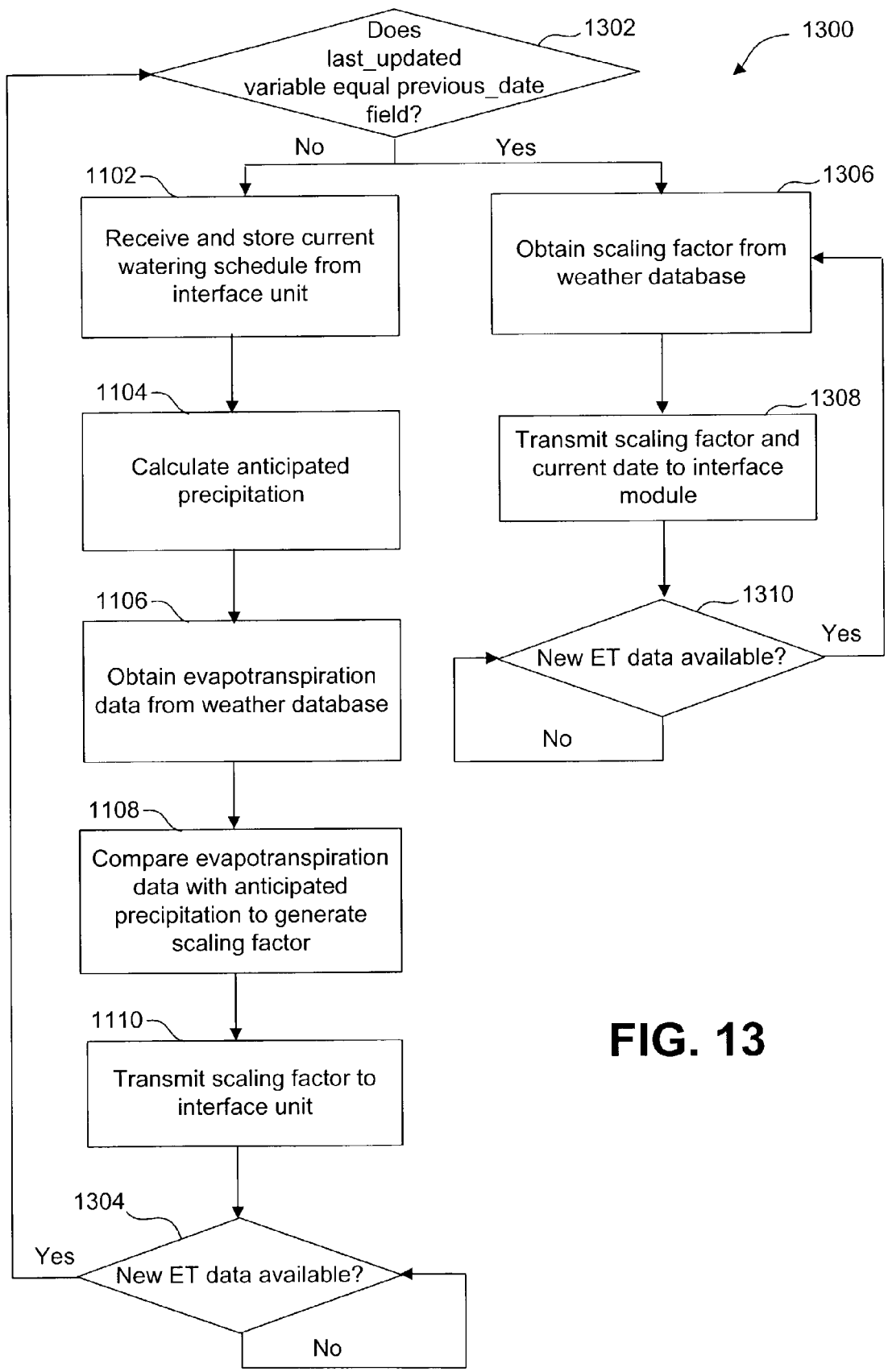
FIG. 13 is a flow diagram illustrating an alternative method for determining optimization data.

FIG. 13 is a flow diagram illustrating an alternative method 1300 for determining optimization data. The method 1300 may be implemented by the computation unit 120 using the hardware components illustrated in FIG. 7 and the software components illustrated in FIG. 9.

The computation unit 120 first determines 1302 whether the last_updated variable 1014 in the interface unit 122 equals the previous_date field 618 in the weather database 116. If it is determined 1302 that the last_updated variable 1014 in the interface unit 122 does not equal the previous_date field 618 in the weather database 116, the method 1300 proceeds with steps 1102 through 1110, as described above. The computation unit 120 then waits until it determines 1304 that new reference evapotranspiration values are available from the weather database 116.

If it is determined 1302 that the last updated variable 1014 in the interface unit 122 equals the previous_date field 618 in the weather database 116, this means that the watering schedule 510 has been optimized according to the previously available evapotranspiration data. Thus, the scaling factor 916 may simply be determined by reference to the percent_change field 620 in the weather database 116. The computation unit 120 then obtains 1306 the percent_change field 620 from the weather database 116 and sets it equal to the scaling factor 916. For example, if the current ET_data field 614 in the weather database 116 is 25% lower than the previous ET_data field 614, the percent_change field 620 may be equal to 0.75. The scaling factor 916 may then also be equal to 0.75. The computation unit 120 then transmits 1308 the scaling factor 916 to the interface unit 122. The computation unit 120 then waits until it determines 1310 that new evapotranspiration data is available. When it is determined 1310 that new evapotranspiration data is available, the method 1300 returns to step 1306 and proceeds as described above.

Figure 14:
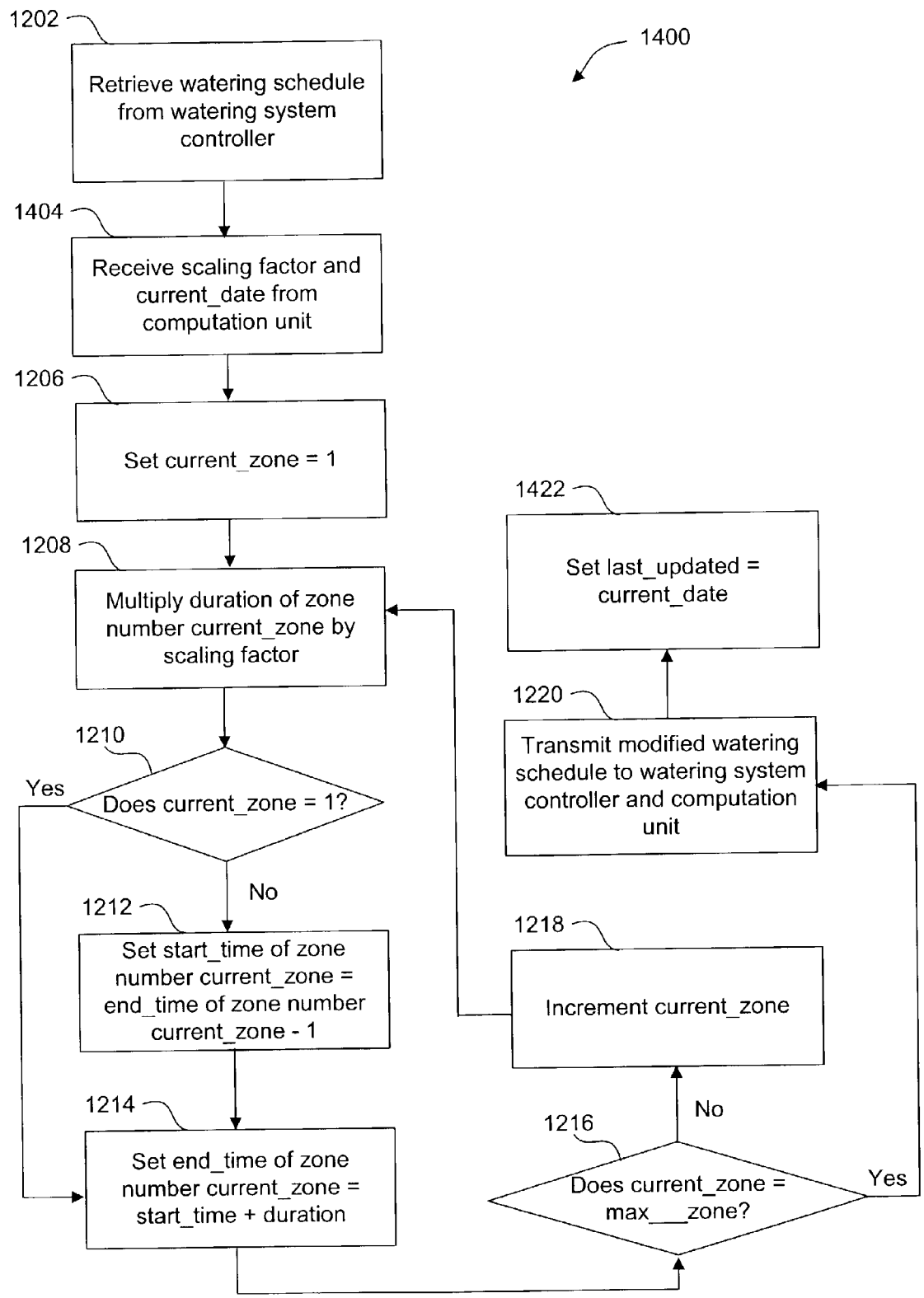
FIG. 14 is a flow diagram illustrating an alternative method for using optimization data to modify a watering schedule stored in the watering system controller.

FIG. 14 is a flow diagram illustrating an alternative method 1400 for using the optimization data generated by the computation unit 120 to modify a watering schedule 510 stored in the watering system controller 112. The method 1400 may be implemented in the interface unit 122 using the hardware components illustrated in FIG. 8 and the software components illustrated in FIG. 10.

The method 1400 is similar to the method 1200 illustrated in FIG. 1200, except for the following two differences. First, when the interface unit 122 receives 1404 the scaling factor 916 from the computation unit 120, the interface unit 122 also receives 1404 the current_date field 616. Second, after the modified watering schedule 510 is transmitted 1220 to the watering system controller 112 and the computation unit 120, the last_updated variable 1014 in the interface unit 122 is set 1422 equal to the current_date field 616.

Figure 15A:
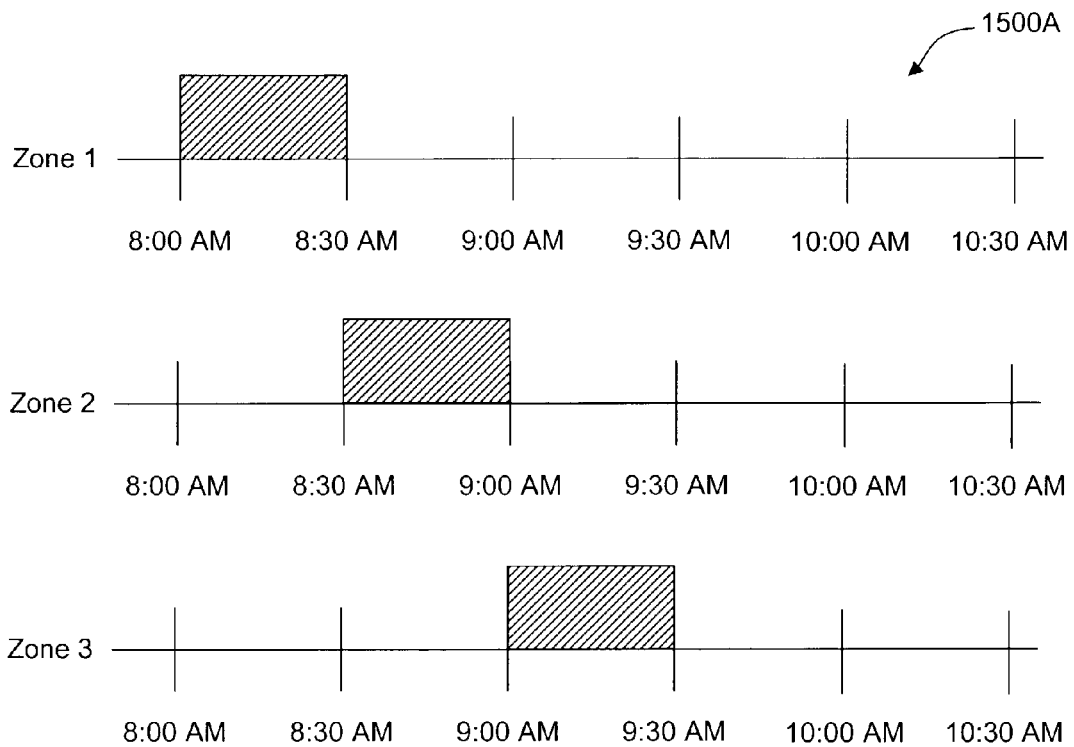
FIG. 15A is a timing diagram illustrating an embodiment of the watering schedule.

FIG. 15A is a timing diagram 1500A illustrating an embodiment of the watering schedule 510. The watering system 110 illustrated in FIG. 15A has three zones 414. This number is exemplary only; the watering system 110 may include any desired number of zones 414. According to the watering schedule 510 shown in FIG. 15A, zone 1 is set to operate from 8:00 AM until 8:30 AM, zone 2 is set to operate from 8:30 AM until 9:00 AM, and zone 3 is set to operate from 9:00 AM until 9:30 AM.

Figure 15B:
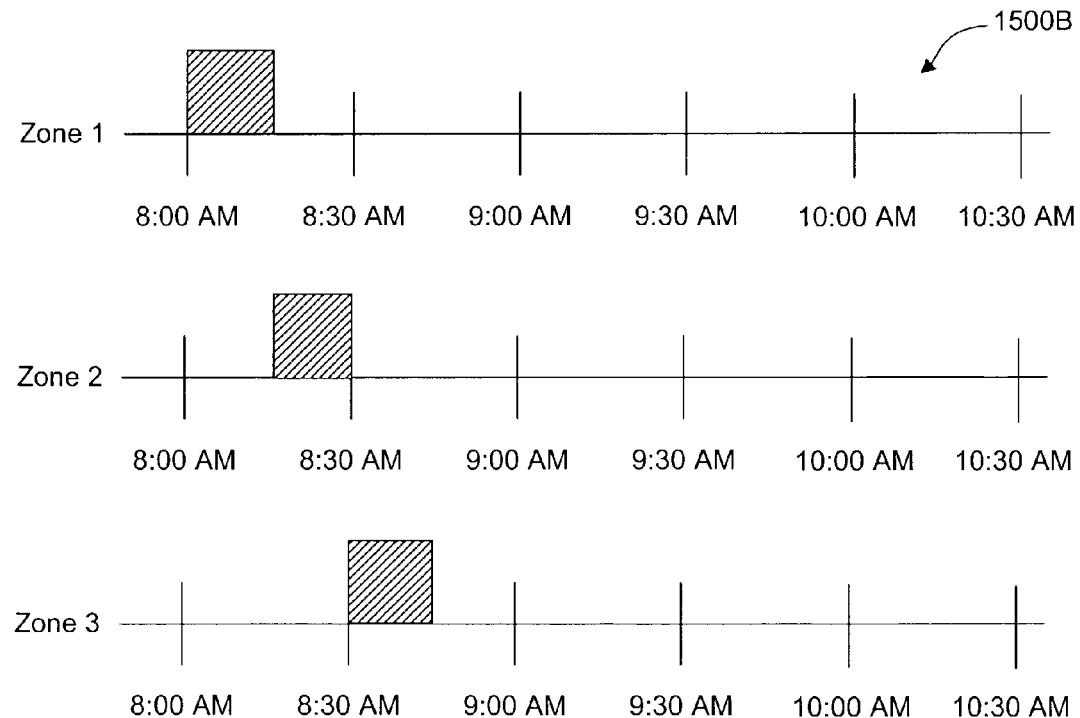
FIG. 15B is a timing diagram illustrating the watering schedule of FIG. 15A after being modified by a scaling factor of 0.5.

FIG. 15B is a timing diagram 1500B illustrating the watering schedule 510 of FIG. 15A after being modified by a scaling factor 916 of 0.5. Zone 1 is now set to operate from 8:00 AM until 8:15 AM, zone 2 is now set to operate from 8:15 AM until 8:30 AM, and zone 3 is set to operate from 8:30 AM until 8:45 AM.

Figure 15C:
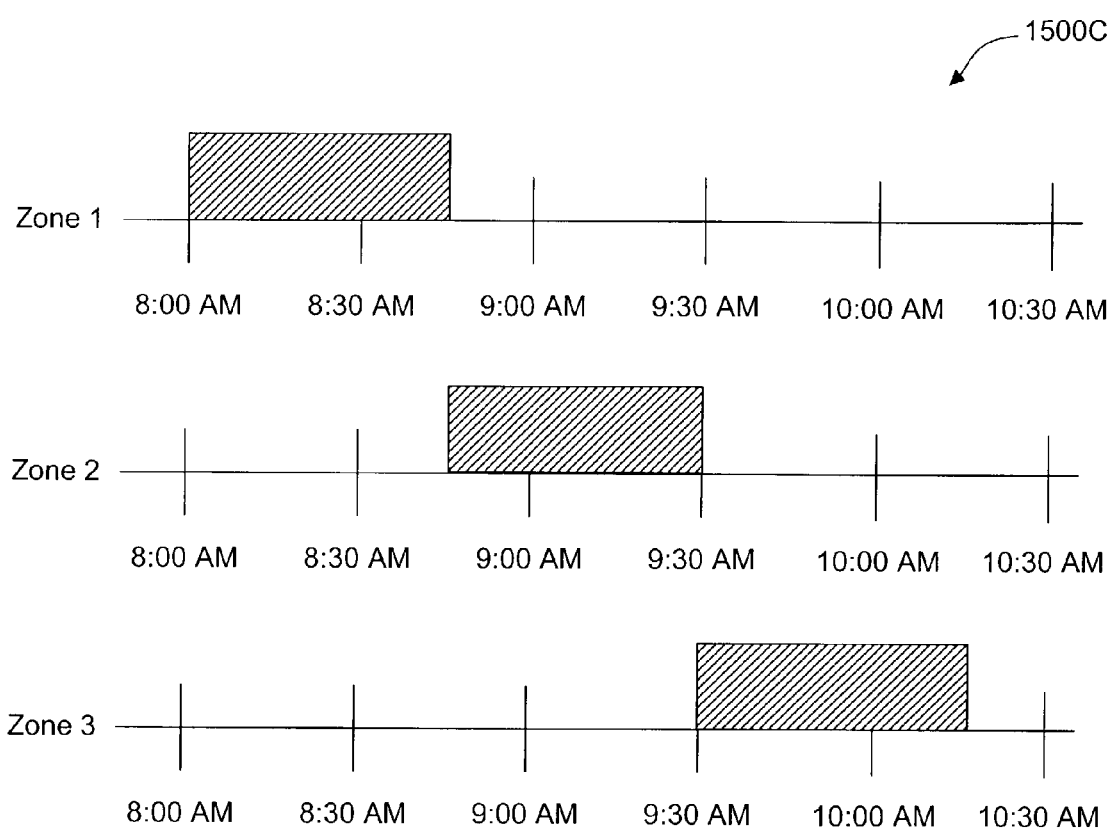
FIG. 15C is a timing diagram illustrating the watering schedule of FIG. 15A after being modified by a scaling factor of 1.5.

FIG. 15C is a timing diagram 1500C illustrating the watering schedule 510 of FIG. 15A after being modified by a scaling factor of 1.5. Zone 1 is now set to operate from 8:00 AM until 8:45 AM, zone 2 is now set to operate from 8:45 AM until 9:30 AM, and zone 3 is set to operate from 9:30 AM until 10:15 AM.

Those of skill in the art would understand that information and signals described herein may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Those of skill in the art would also understand that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An interface unit for communicating with a watering system controller, comprising:

a first interface configured to receive optimization data over the Internet;

a second interface configured for electronic communications with a watering system controller that controls operation of a watering system according to watering instructions stored in the watering system controller;

a processor in electronic communication with the first interface and the second interface such that the interface unit functions as an interface between the Internet and the watering system controller; and memory in electronic communication with the processor, the memory being programmed to receive optimization data over the Internet and the memory being programmed with modification instructions for using the optimization data to modify the watering instructions.

2. The interface unit of claim 1, wherein the memory is also programmed with transmitting instructions for transmitting modified watering instructions over the Internet to a computation unit.

3. The interface unit of claim 2, wherein the watering instructions comprise a watering schedule which specifies a length of operation of the watering system.

4. The interface unit of claim 3, wherein the optimization data comprises a scaling factor which specifies how the watering schedule is adjusted.

5. The interface unit of claim 4, wherein the optimization data is calculated based on weather information obtained from a weather database.

6. The interface unit of claim 5, wherein the weather information comprises evapotranspiration data.

7. The interface unit of claim 6, wherein the scaling factor is calculated based on a comparison of an anticipated precipitation value for the watering system and current evapotranspiration data for a geographic region in which the watering system is located.

8. The interface unit of claim 6, wherein the scaling factor is calculated based on a comparison of previous evapotranspiration data and current evapotranspiration data for a geographic region in which the watering system is located.

9. The interface unit of claim 1, wherein the watering system is selected from the group consisting of a sprinkler system and a drip irrigation system.

* * * * *

UNITED STATES PATENT AND TRADEMARK OFFICE
CERTIFICATE OF CORRECTION

PATENT NO. : 7,146,254 B1 Page 1 of 1
APPLICATION NO. : 10/190179
DATED : December 5, 2006
INVENTOR(S) : Michael L. Howard It is certified that error appears in the above-identified patent and that said Letters Patent is hereby corrected as shown below:

In Column 6, line 35, please replace "system 10" with --system 110--.

Signed and Sealed this

First Day of May, 2007

JON W. DUDAS
*Director of the United States Patent and Trademark Office*